US007912813B2

(12) United States Patent
Rajaraman et al.

(10) Patent No.: US 7,912,813 B2
(45) Date of Patent: Mar. 22, 2011

(54) CMDB-BASED POLICY PROPAGATION

(75) Inventors: Bala Rajaraman, Cary, NC (US); David B. Lindquist, Raleigh, NC (US); David L. Kaminsky, Chapel Hill, NC (US); Neeraj Joshi, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 11/772,865

(22) Filed: Jul. 3, 2007

(65) Prior Publication Data

US 2009/0012997 A1 Jan. 8, 2009

(51) Int. Cl.
*G06F 7/00* (2006.01)
(52) U.S. Cl. ........................................ 707/634; 707/802
(58) Field of Classification Search .................. 358/1.15; 707/609, 634
See application file for complete search history.

(56) References Cited

U.S. PATENT DOCUMENTS

2007/0268516 A1 * 11/2007 Bugwadia et al. ........... 358/1.15
2007/0288281 A1 * 12/2007 Gilbert et al. ..................... 705/8

* cited by examiner

*Primary Examiner* — Charles Rones
*Assistant Examiner* — Belix M Ortiz
(74) *Attorney, Agent, or Firm* — Charles L. Moore; Moore & Van Allen PLLC

(57) ABSTRACT

A configuration management database (CMDB) that associates a policy with a configuration item (CI) in the CMDB. The policy contains an "applies to" field and a "type descriptor". When a relationship is created between the CI and a second CI in the CMDB, the policy is associated with the second CI. The type descriptor of the policy may be evaluated and the policy associated with the second CI in response to the evaluation. The policy may contain a type descriptor comprising an instance of a CI type. The policy may contain a type descriptor comprising a CI type. The policy may contain an "applies to" field having a value of "this CI type". The policy may contain an "applies to" field having a value of "hosting environment of this CI type". The type descriptor may include a hosted CI component portion and a hosting CI component portion.

18 Claims, 5 Drawing Sheets

CMDB-BASED POLICY PROPAGATION

BACKGROUND OF THE INVENTION

The present invention is related to configuration management databases, and more specifically to configuration management database (CMDB)-based policy propagation.

Policy is an approach for both governance and automation. Governance constrains behavior of people and resources. Automation replaces (or supplements) human actions with automated actions. Configuration management databases (CMDBs) hold resource configuration data and relationships among the resources, among other information.

FIG. 1 shows a diagram of information contained in a configuration management database (CMDB). A CMDB 100 may contain a model of the physical topology 101 showing the various physical components of a network, system, enterprise, etc., and a database 102 that contains relationships among the physical components shown in the physical topology. In this example, the network contains a router 102 interconnected to a Linux® server 103 (Linux is a registered trademark of Linus Torvalds in the United States, other countries, or both. Further, the Linux server 103 that may host a trading application 104. The trading application 104 may use a Network Attached Storage (NAS) 105 and database 106.

The CMDB stores the relationships among these physical components as shown in the database 102 which has configuration items for each of the physical components shown in the physical topology 101. Accordingly, the CMDB will contain a router configuration item 112 representing with the router 102, a NAS configuration item 115 representing the NAS 105, a trading application configuration item 114 representing the trading application 104, a Linux server configuration item 113 representing the Linux server 103, and a database configuration item 116 representing the database 106.

BRIEF SUMMARY OF THE INVENTION

According to one aspect of the present invention, a method for a configuration management database (CMDB) includes associating a policy with a configuration item (CI) in the CMDB, the policy containing an "applies to" field and a type descriptor, creating a relationship between the CI and a second CI in the CMDB, and associating the policy with the second CI.

According to another aspect of the present invention, a configuration management database (CMDB) includes at least one configuration item (CI), and at least one policy, each at least one policy containing an applies to field and a type descriptor and being associable with at least one of the at least one CI, wherein when a relationship is created between a first CI of the at least one CI and a second CI of the at least one CI, a type descriptor of a policy associated with the first CI is associated with the second CI.

According to yet another aspect of the present invention, a computer program product may include a computer useable medium having computer useable program code embodied therewith, the computer useable program code comprising computer useable program code configured to associate a policy with an configuration item (CI) in the CMDB, the policy containing an applies to field and a type descriptor, computer useable program code configured to create a relationship between the CI and a second CI in the CMDB, and computer useable program code configured to associate the policy with the second CI.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
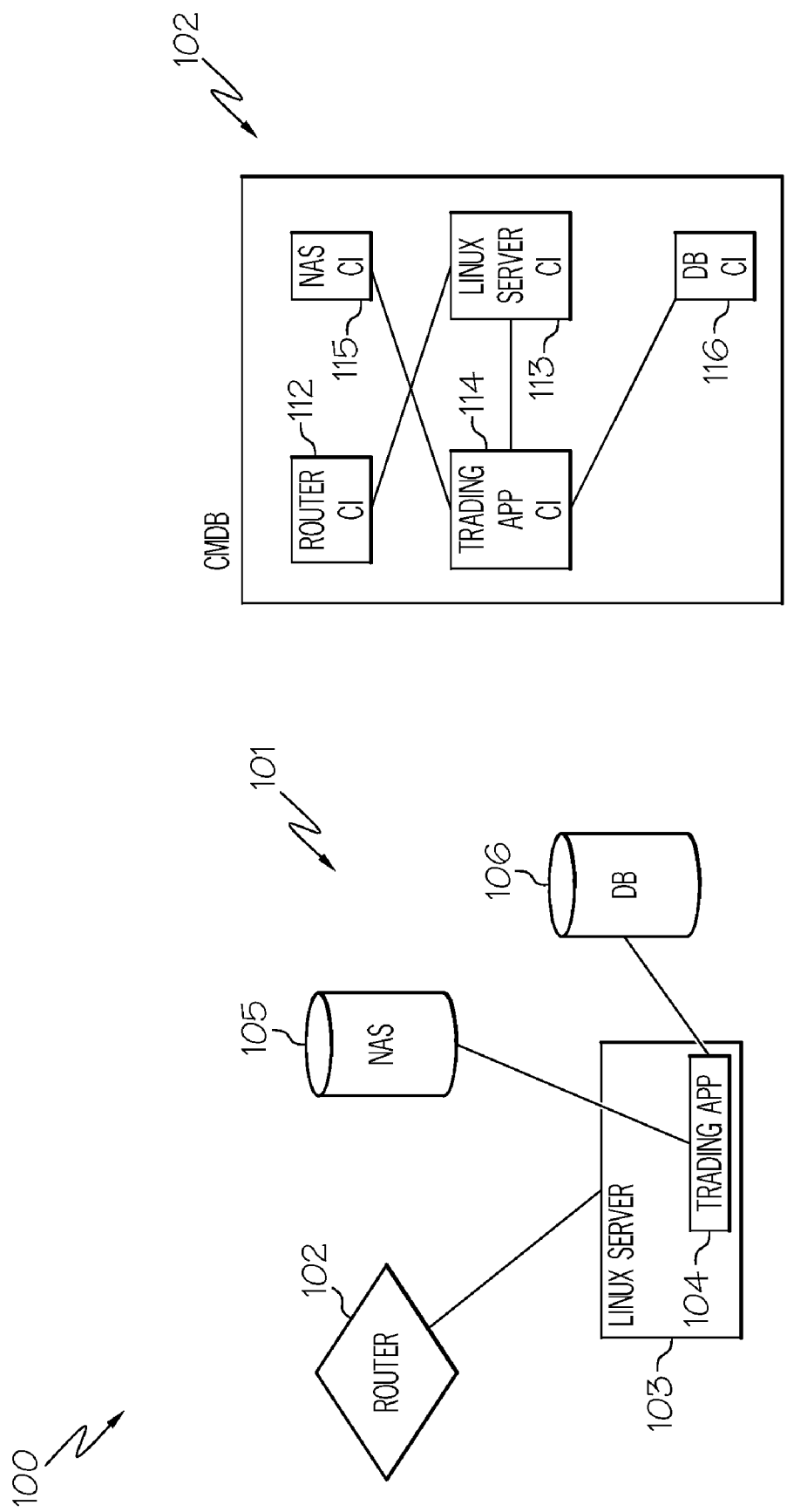
FIG. 1 shows a diagram of information contained in a configuration management database (CMDB)

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

Embodiments according to the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks. Alternatively, computer program implemented actions may be combined with operator or human implemented actions in order to carry out an embodiment of the invention.

Embodiments according to the present invention may include a 'policy' construct in the CMDB data model. Further each policy may have an "applies to" field where the "applies to" field may have different values, for example, "THIS_TYPE", "HOSTING ENVIRONMENT", etc. Moreover, in embodiments according to the present invention, policies may also have a "type"field. The "type" field may apply to a configuration item (CI) instance (e.g., Linux server 123) or to a CI type (e.g., Linux servers, servers, etc.).

When a CI is added to the system, all policies with "applies to" THIS_TYPE and the appropriate type are applied. For example, Linux systems may be assigned all Linux policies, and an instance of a Linux server (e.g., Linux server 123) may also be assigned the instance policies.

In embodiments according to the present invention, where the "applies to" field is HOSTING_ENVIRONMENT, then the type field may have at least two parts: a type or instance of the "hosted" component and a type or instance of the "hosting" component.

When a resource is added to the system, all policies with "applies to" HOSTING_ENVIRONMENT and the appropriate hosted type may be applied to the added resource. For example, IBM® WebSphere® Application Server may be assigned all policies where the WebSphere Application Server is hosted (IBM and WebSphere are registered trademarks of International Business Machines Corporation in the United States, other countries, or both). When a hosting relationship is established in the CMBD, HOSTING_ENVIRONMENT policies flow from the hosted component to the hosted by component, and "applies to" may be set to SELF for the hosted by component. Further, types may be ordered, for example, a Linux_Server type might be an instance of a Server type. All Server and Linux_Server policies may then apply to the Linux_Server type.

To help illustrate an embodiment of the present invention, the following simple example is presented. Assume that a critical business application B runs on a Microsoft® Windows® operating system (version elided) (Microsoft and Windows are registered trademarks in the United States, other countries, or both).

Figure 2:
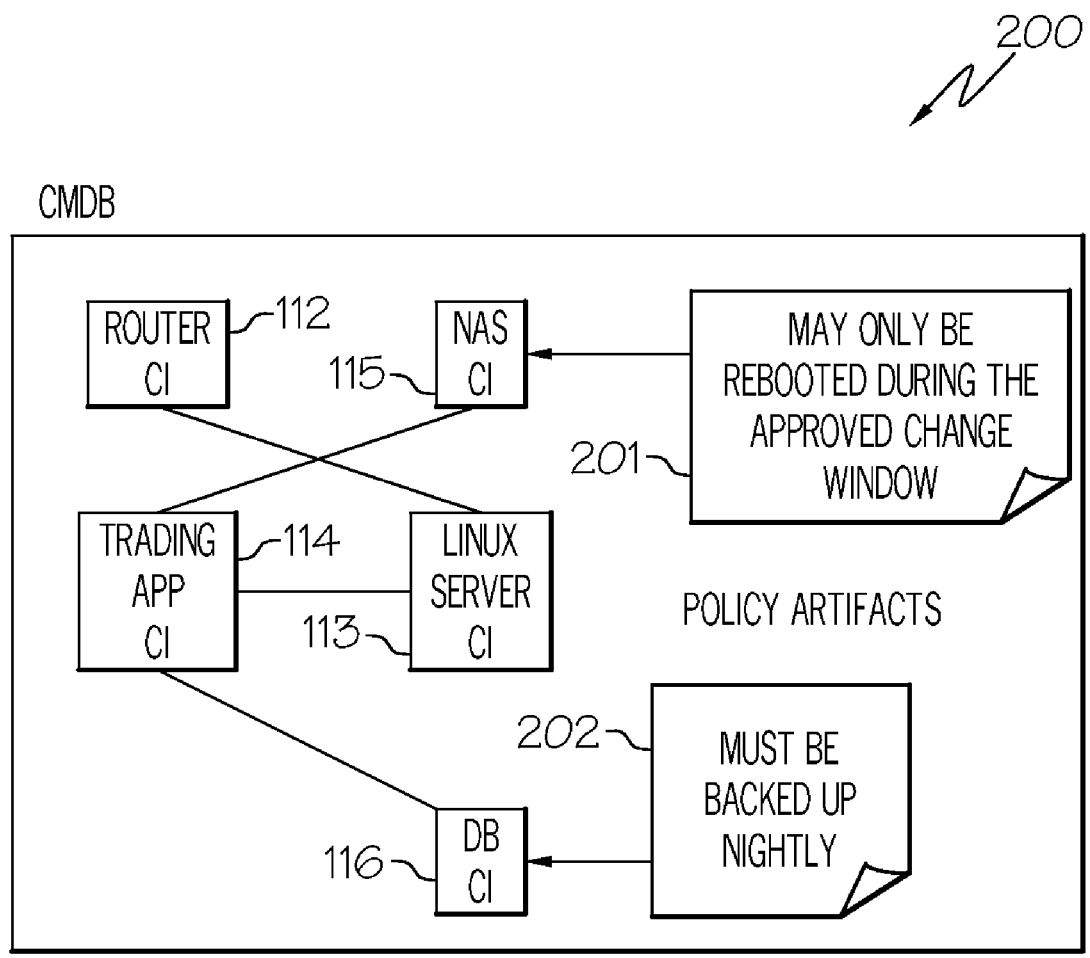
FIG. 2 shows a diagram of a CMDB containing policies according to an example embodiment of the present invention.

Example Policy 1:
"Critical patches must be applied within 48 hours of certification by the CIO's office."
Applies to: THIS_TYPE
Type: Windows servers
Example Policy 2:
"Reboot is allowed only during the defined change window"
Applies to: HOST_ENVIRONMENT
Hosted Type: critical_business_application,
Hosted By Type: Windows servers
Example Scenario
1. A Windows server W is added to the CMDB.
2. The system automatically associates a configuration item (CI) holding Policy 1
3. Application B is added to the CMDB.
4. A hosting association between B and W is added to the CMDB
5. The CMDB associates Policy 2 with W. Applies to is set to SELF FIG. 2 shows a diagram of a CMDB containing policies according to an example embodiment of the present invention. The CMDB 200 may include one or more configuration items containing information and relationships regarding one or more physical components in a network or enterprise. The example embodiment in FIG. 2 includes a router configuration item 112, a network attached storage (NAS) configuration item 115, a trading application configuration item 114, a Linux server configuration item 113, and a database configuration item 116. Further, the CMDB may include one or more policy configuration items that may be associated with one or more of the other configuration items. The relationships between the configuration items are shown via the solid lines. In this example embodiment, a policy configuration item 201 is associated with the NAS configuration item 115. This example policy 201 states that an associated configuration item (e.g., NAS CI 115) may only be rebooted during the approved change window. Further, in this example embodiment, a second policy configuration item 202 is associated with the database configuration item 116, and requires that all associated configuration items must be backed up nightly.

Figure 3:
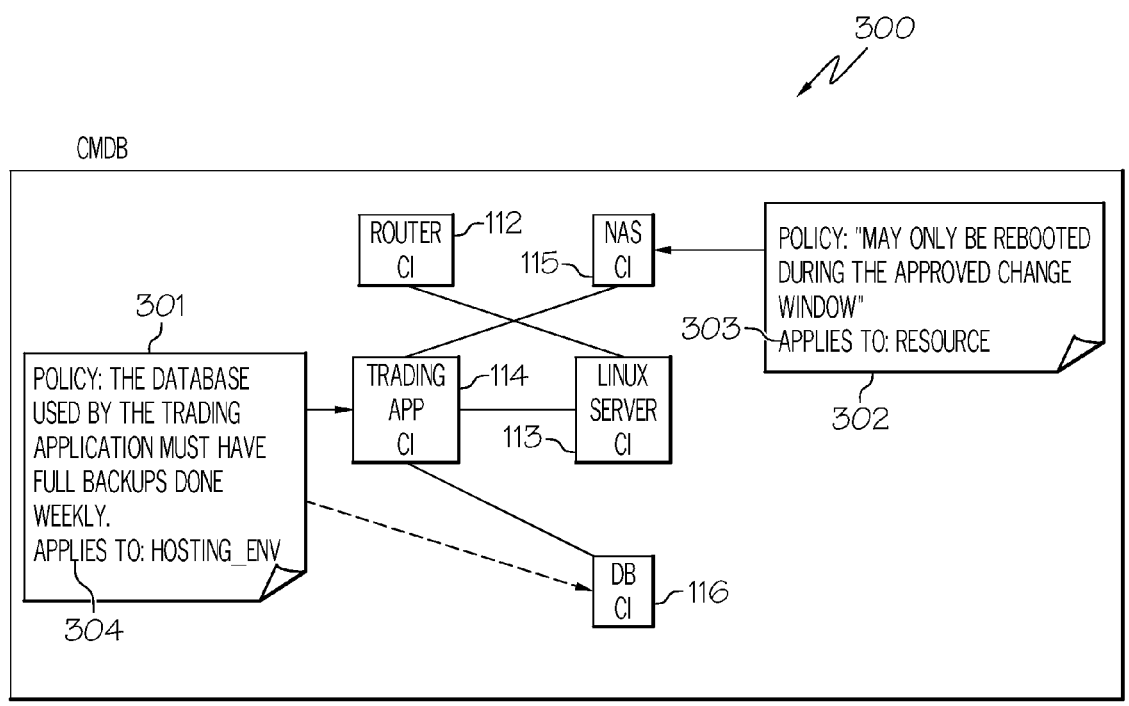
FIG. 3 shows a diagram of a CMDB that includes policies showing the applies to field according to an example embodiment to the present invention.

FIG. 3 shows a diagram of a CMDB that includes policies showing the "applies to" field according to an example embodiment to the present invention. As shown in the CMDB 300, various configuration items and policies may be included in the CMDB 300. In this example embodiment, the CMDB 300 may include a router CI 112, a trading application CI 114, a Linux server CI 113, a NAS CI 115, and a database CI 116. The relationships between the configuration items are shown via the solid lines. Further, the CMDB 300 may include one or more policies associated with one or more of the configuration items. In this example embodiment, as shown previously, a policy 302 may be associated with the NAS CI 115 that may require that associated CIs may only be rebooted during the approved change window. The policy 302 may also include an "applies to" field 303 which in this case states "resource" (i.e., configuration item associated with the resource). This suggests that this policy may be applied to the configuration item (e.g., NAS CI 115). Further, this example embodiment includes a second policy 304 that may be associated with the trading application CI 114. This policy 301 also includes an "applies to" field 304 where in this embodiment the "applies to" field is "hosting environment." The second policy 301 requires that the database used by the configuration item (e.g., trading application) must have full backups done weekly. The second policy 301 is associated with the trading application (solid line), but may be applied to any database used by the trading application (dotted line). When the association between the trading application CI 114 and the database CI 116 is created, the "applies to" field may cause the secondary association (dotted line) to be created.

Figure 4:
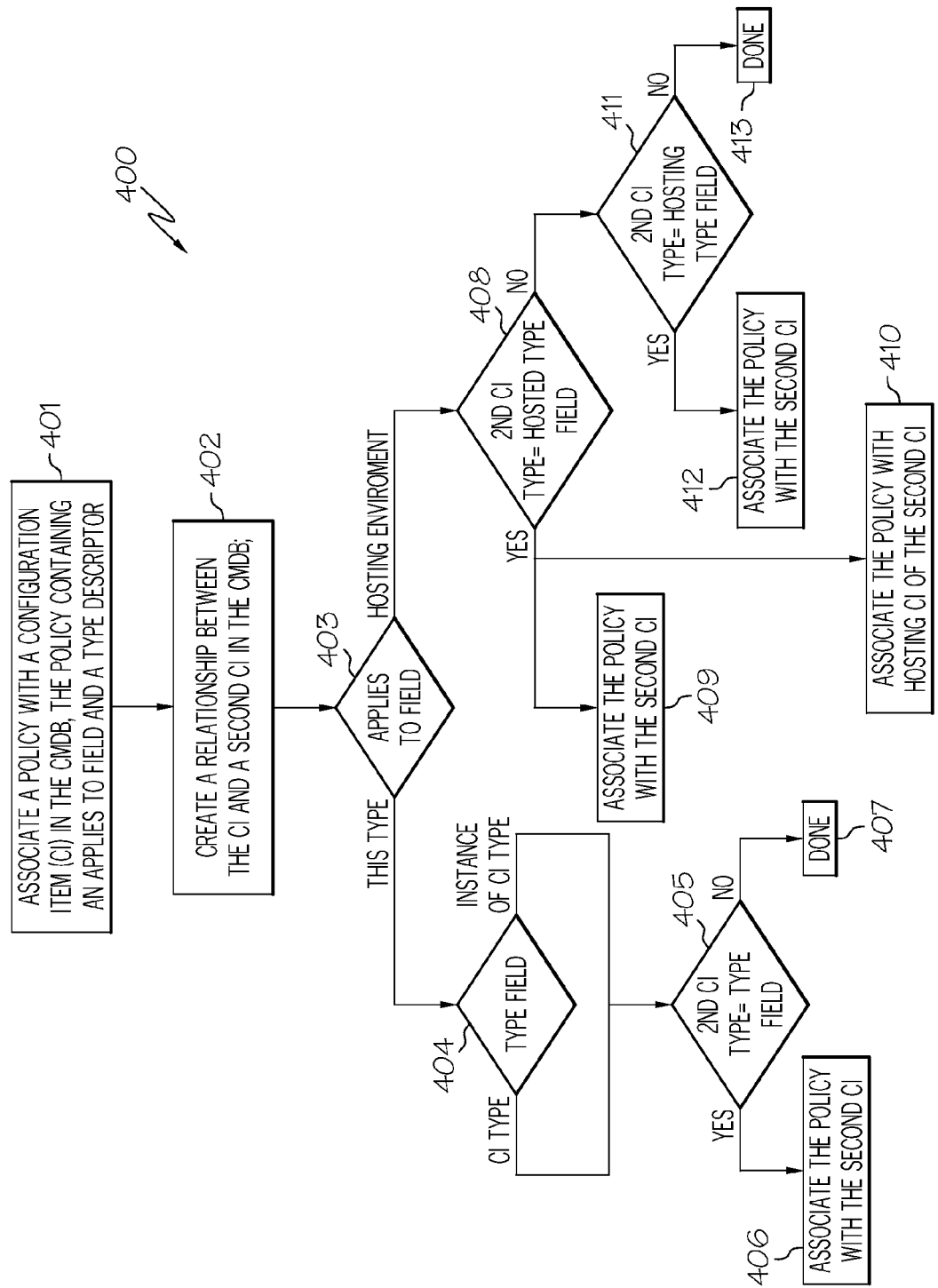
FIG. 4 shows a flowchart of a process for a configuration management database (CMDB) according to an example embodiment of the present invention.

FIG. 4 shows a flowchart of a process for a configuration management database (CMDB) according to an example embodiment of the present invention. The process 400 may include in block 401 that a policy may be associated with a configuration item (CI) in the CMDB where the policy contains an "applies to" field and a type descriptor. In block 402, a relationship may be created between the CI and a second CI in the CMDB. In block 403, the "applies to" field may be analyzed to determine if it is "this type" or "hosting environment." If the "applies to" field is "this type," in block 404, the type field may be analyzed to determine if it is a CI type or an instance of a CI type. In block 405 it may be determined if the second CI type is the same as the type in the type field. If the second CI type is the same as the type in the type field, in block 406 the policy may be associated with the second CI. If the second CI type is not the same as the type in the type field, in block 407 the process ends.

If the "applies to" field in block 403 is "hosting environment", in block 408 it may be determined if the second CI type is the same as the type in the "hosted type" field. If the second CI type is the same as the type in the "hosted type" field, the policy may be associated with the second CI in block 409, and in block 410, the policy may be associated with the hosting CI of the second CI. If the second CI type is not the same as the type in the "hosted type" field in block 408, it may be determined in block 411 if the second CI type is the same as the type in the "hosting type" field, and if not, in block 413 the process ends. If the second CI type is the same as the type in the "hosting type" field, in block 412 the policy may be associated with the second CI.

Figure 5:
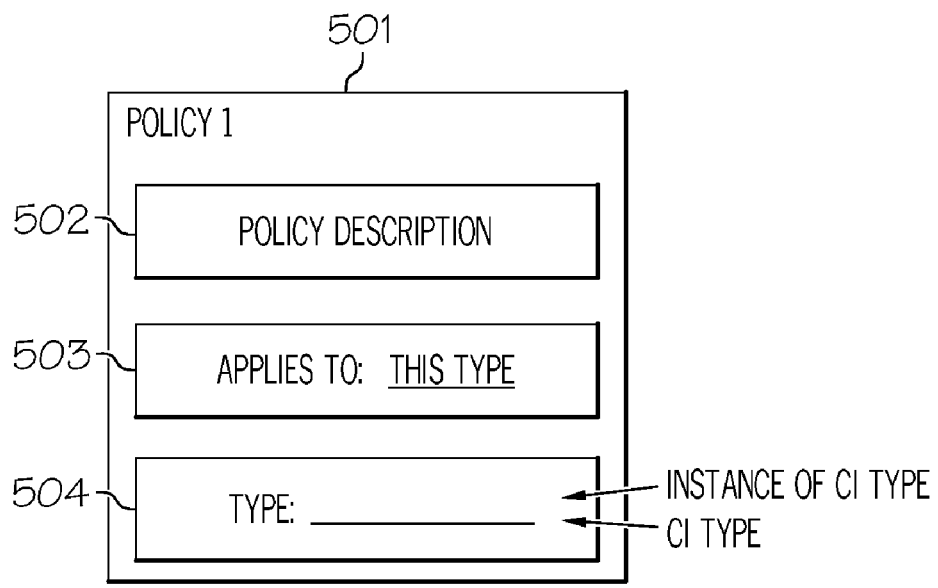
FIG. 5 shows a diagram of a policy in a CMDB according to an example embodiment of the present invention.

FIG. 5 shows a diagram of a policy in a CMDB according to an example embodiment of the present invention. The policy 501 may include a policy description 502, an "applies to" field 503, and a "type" field 504. In this example embodiment, the policy "applies to" field is "this type." The "type" field 504 may be an instance of a configuration item type or a configuration item type.

Figure 6:
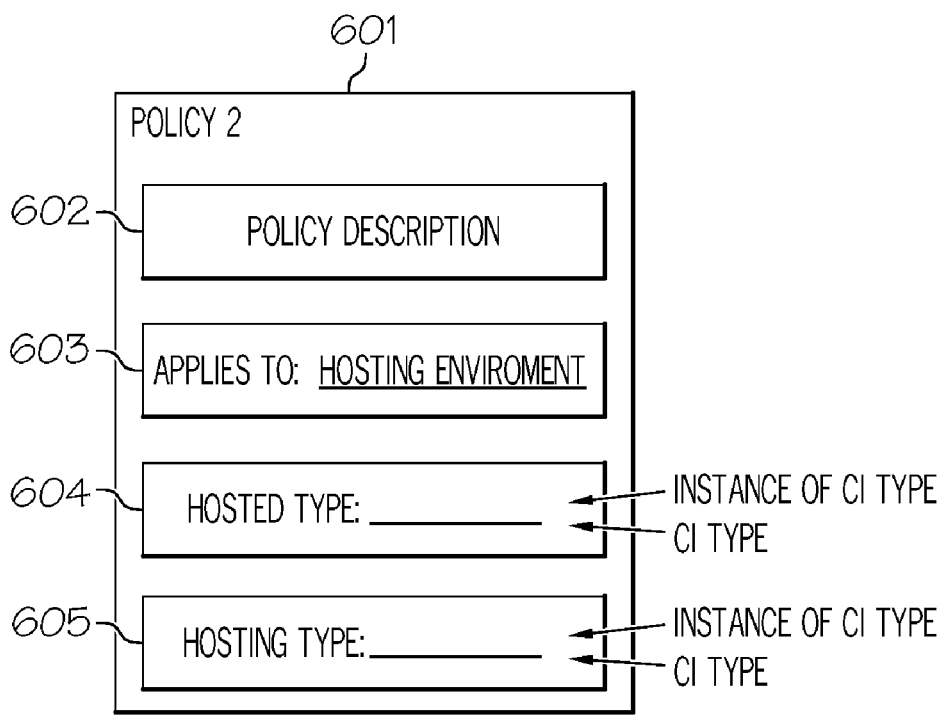
FIG. 6 shows a diagram of a policy in a CMDB according to another example embodiment of the present invention.

FIG. 6 shows a diagram of a policy in a CMDB according to another example embodiment of the present invention. The policy 601 may be a configuration item in a CMDB and may contain a policy description 602, an "applies to" field 603, a "hosted type" field 604 and a "hosting type" field 605. In this example embodiment, the policy "applies to" field 603 contains "hosting environment." Policies according to this embodiment may include a "hosted type" field 604 and "hosting type" field 605 where each of these fields may be either an instance of a configuration item type or a configuration item type.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for a configuration management database (CMDB) comprising:
   associating, by a computer, a policy with a configuration item (CI) in the CMDB, the policy containing an "applies to" field and a type descriptor;
   creating, by the computer, a relationship between the CI and a second CI in the CMDB;
   determining, by the computer, if the "applies to" field comprises a "this type" value or a "hosting environment" value relative to the type descriptor; and
   associating, by the computer, the policy with the second CI based on the "applies to" field and a second type descriptor of the second CI.

2. The method according to claim 1, further comprising evaluating the type descriptor of the policy and associating the policy with the second CI, in response to the evaluation.

3. The method according to claim 1, further comprising the policy containing a type descriptor comprising an instance of a CI type.

4. The method according to claim 1, further comprising the policy containing a type descriptor comprising a CI type.

5. The method according to claim 1, further comprising determining if the second CI is a same type as contained in a type field of the policy in response to the "applies to" field having the value of "this type".

6. The method according to claim 1, further comprising the policy containing determining if the second CI is a same type as contained in a hosted type field of the policy in response to the "applies to" field having the value of "hosting environment".

7. The method according to claim 6, further comprising the type descriptor comprising a hosted CI component portion and a hosting CI component portion.

8. A configuration management database (CMDB) comprising:
   at least one configuration item (CI), wherein the at least one CI comprises one of a hardware device and an application stored on a storage device;
   at least one policy, each at least one policy containing an "applies to" field and a type descriptor and being associable with at least one of the at least one CI; and
   wherein when a relationship is created between a first CI of the at least one CI and a second CI of the at least one CI a policy associated with the first CI is associated with the second CI based on the "applies to" field and a second type descriptor of the second CI, and wherein the "applies to" field comprises a "this type" value or a "hosting environment" value relative to the type descriptor.

9. The CMDB according to claim 8, wherein the type descriptor of the policy associated with the first CI is evaluated and associated with the second CI in response to the evaluation.

10. The CMDB according to claim 8, wherein the associated policy contains a type descriptor comprising an instance of a CI type.

11. The CMDB according to claim 8, wherein the associated policy contains a type descriptor comprising a CI type.

12. The CMDB according to claim 8, wherein the type descriptor comprises a hosted CI component portion and a hosting CI component portion.

13. A computer program product comprising a computer useable computer readable storage medium having computer useable program code embodied therewith, the computer useable program code comprising:
   computer useable program code configured to associate a policy with a configuration item (CI) in the CMDB, the policy containing an "applies to" field and a type descriptor;
   computer useable program code configured to create a relationship between the CI and a second CI in the CMDB;
   computer useable program code configured to determine if the "applies to" field comprises a "this type" value or a "hosting environment" value relative to the type descriptor; and
   computer useable program code configured to associate the policy with the second CI based on the "applies to" field and a second type descriptor of the second CI.

14. The computer program product according to claim 13, further comprising computer useable program code configured to evaluate the type descriptor of the policy and computer useable program code configured to associate the policy with the second CI in response to the evaluation.

15. The computer program product according to claim 13, further comprising the policy containing a type descriptor comprising one of an instance of a CI type or a CI type.

16. The computer program product according to claim 13, further comprising computer useable program code configured to determine if the second CI is a same type as contained in a type filed of the policy in response to the "applies to" field having the value of "this type".

17. The computer program product according to claim 13, further comprising the policy containing computer useable program code configured to determine if the second CI is a same type as contained in a hosted type field of the policy in response to the "applies to" field having the value of "hosting environment".

18. The computer program product according to claim 17, further comprising the type descriptor comprising a hosted CI component portion and a hosting CI component portion.

* * * * *